Aug. 11, 1970
D. B. CHENOWETH ET AL
3,523,406
METHOD AND APPARATUS FOR REMOVING ENTRAINED DISCRETE
IMMISCIBLE MATTER FROM LIQUIDS BY VELOCITY
GRADIENT SEPARATION
Original Filed Feb. 19, 1963
2 Sheets-Sheet 1
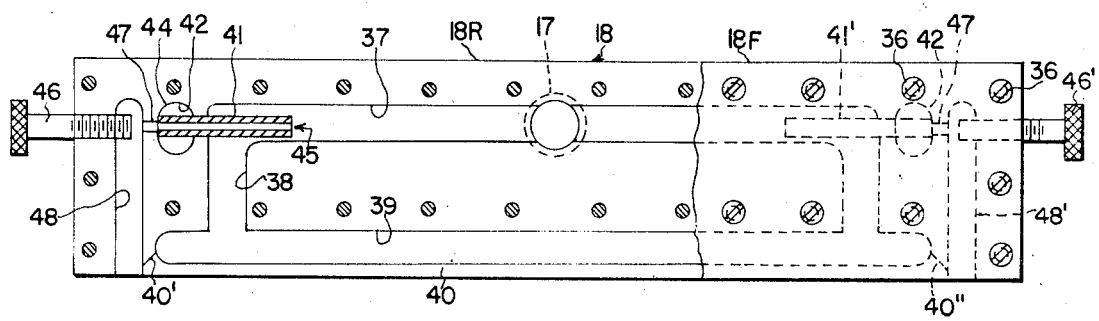
FIG. 1
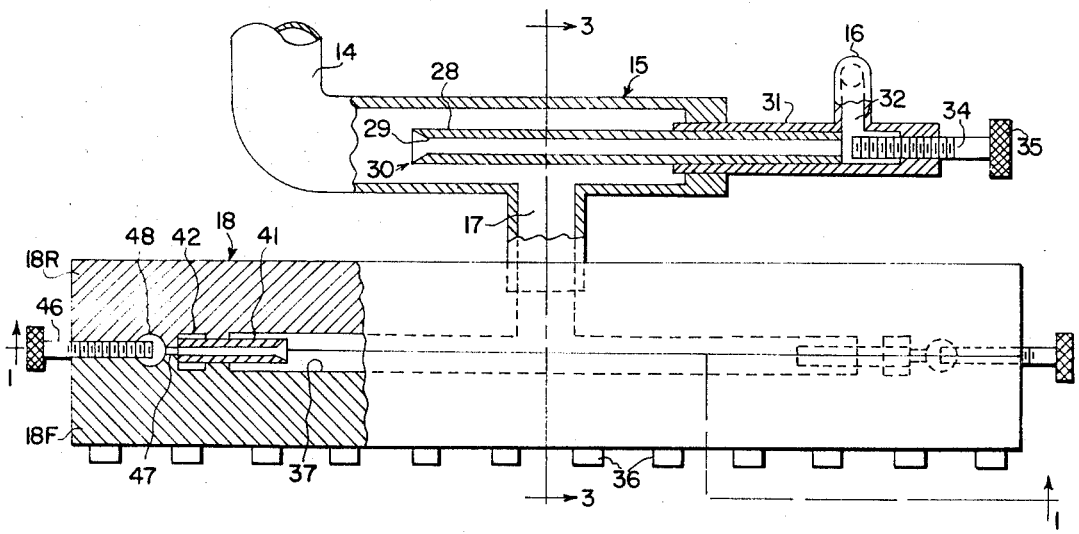
FIG. 2
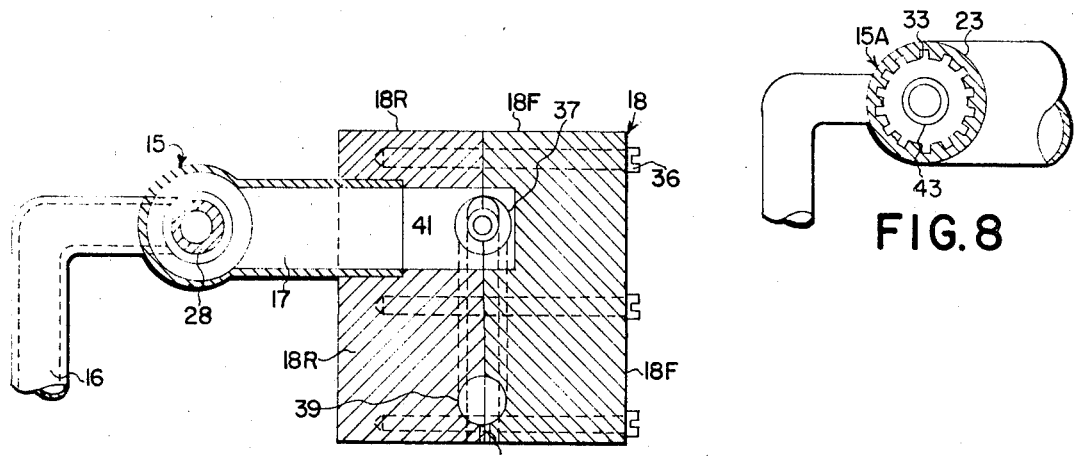
FIG. 3
FIG. 8
DEAN B. CHENOWETH
RICHARD LOUIS BARNARD
*INVENTORS*
BY *William J. French*
*Charles L. Good*
ATTORNEYS

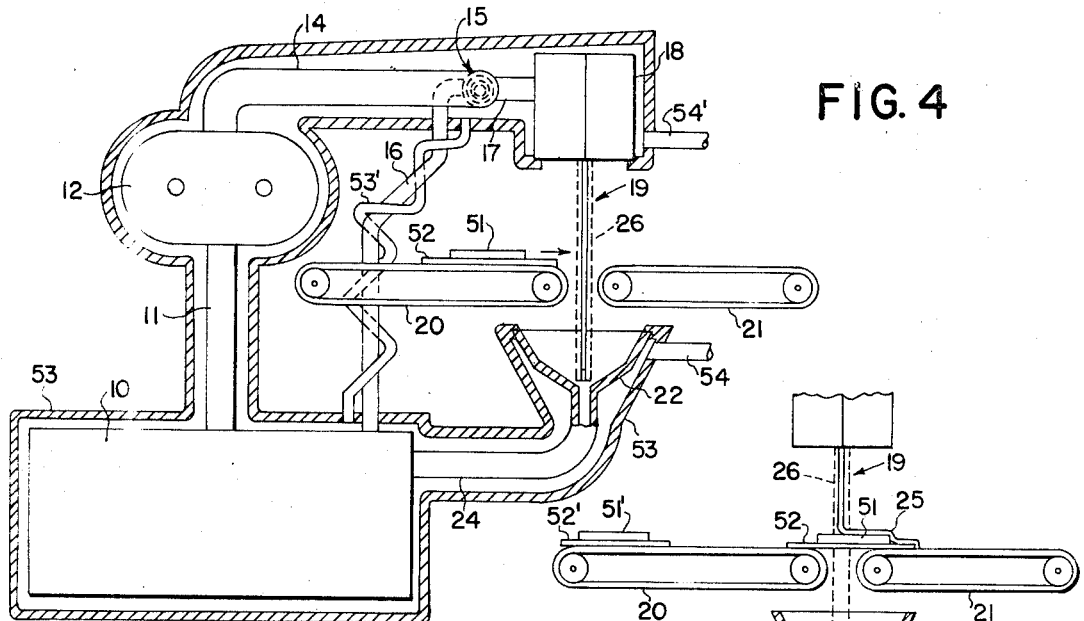
FIG. 4
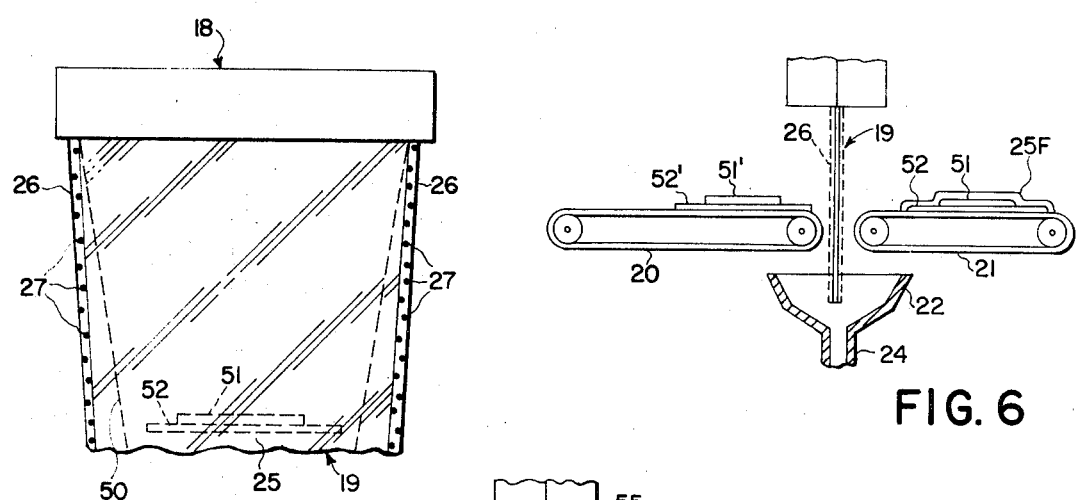
FIG. 5
FIG. 6
FIG. 7
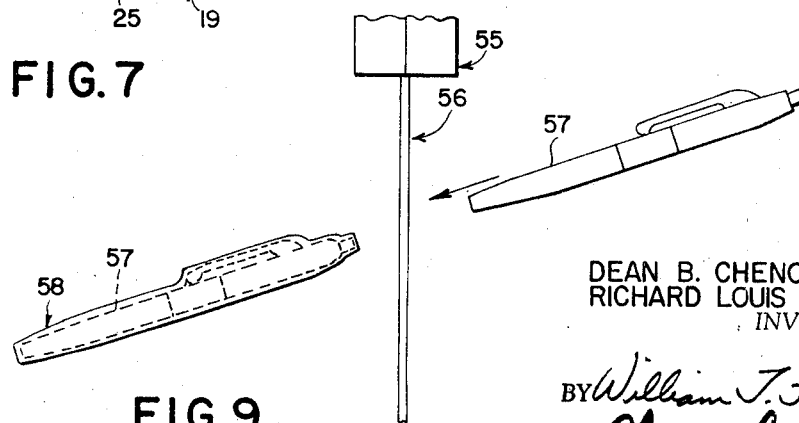
FIG. 9
DEAN B. CHENOWETH
RICHARD LOUIS BARNARD
INVENTORS
BY William J. French
Charles L. Good
ATTORNEYS United States Patent Office 3,523,406
Patented Aug. 11, 1970

3,523,406
METHOD AND APPARATUS FOR REMOVING ENTRAINED DISCRETE IMMISCIBLE MATTER FROM LIQUIDS BY VELOCITY GRADIENT SEPARATION
Dean B. Chenoweth, Minneapolis, and Richard Louis Barnard, Wayzata, Minn., assignors, by mesne assignments, to Eastman Kodak Company
Application Feb. 19, 1963, Ser. No. 259,707, now Patent No. 3,299,195, dated Jan. 17, 1967, which is a continuation-in-part of application Ser. No. 178,128, Mar. 7, 1962. Divided and this application Jan. 16, 1967, Ser. No. 627,278.
Int. Cl. B01d 19/00
U.S. Cl. 55—55          10 Claims

ABSTRACT OF THE DISCLOSURE

Contaminating particles and/or bubbles are removed from viscous liquids by propelling the contaminated liquid in laminar flow through an outer conduit in which a smaller concentric inner conduit is located having an open end facing the flow of liquid whereby contaminating particles in the contaminated liquid move as a result of velocity gradient separation toward the center of the flowing liquid and are removed through the inner conduit. Preferably, the capacity of the inner conduit is in the range of from $\frac{1}{36}$ to $\frac{9}{16}$ the capacity of the outer conduit and extends through the wall of the outer conduit at a point downstream from the inner opening of the inner conduit, the capacity of the downstream portion of the outer conduit together with the capacity of the inner conduit being substantially equal.

---

This application is a division of Ser. No. 259,707, filed Feb. 19, 1963, now U.S. Pat. 3,299,195, issued Jan. 17, 1967, and a continuation-in-part of Ser. No. 178,128, filed Mar. 7, 1962, now abandoned.

This invention relates to and provides a new and unusual method and apparatus for separating, from a mass of liquid, liquid carrying discrete immiscible matter and disclosed in an exemplary use with respect to removing entrained bubbles of gas, such as air, vapor and the like, from liquids, including viscous liquids such as molten synthetic resins, by velocity gradient separation, to yield substantially bubble-free liquids, the coating method thereby made feasible and a coated article produced thereby.

The method of this invention contemplates the propelling of a liquid in a column to establish a linear flow known as laminar flow, retarding the liquid flow adjacent the periphery of the column to cause entrained immiscible matter such as bubbles, and particularly visible bubbles of entrained gas, to move toward the center of the column, either once, or progressively, to remove at least the major portion of said entrained gas bubbles, and preferably to remove all bubbles according to visual inspection.

Specifically, the structure for extracting gas bubbles from the liquid in which they are entrained includes at least one set of tubular conduits, one of which is smaller than and substantially concentrically positioned within the other and receives the liquid with the entrained bubbles as a result, it is thought, of their being concentrated according to the velocity gradient of the liquid flow within the larger tubular conduit in a relatively high speed, low shear area of flow near the center of the larger conduit while the peripheral portion of the liquid is slowed down and maintained at a higher shear stress as the result of friction between the liquid and the outer of the two tubes.

This invention also provides a clear film projecting apparatus including one or more velocity gradient bubble removing means and may include a nozzle having means for discharging residual bubble carrying liquid at spaced points in contact with the sides of a discharge film from which bubbles have been removed to serve as a means for holding this curtain or film in a stretched condition for a majority of its extension to a coating area. The structure of the invention also affords choke control means which permits maximum flow of clear liquid consistent with efficient bubble removal.

The invention also provides novel coated articles including an article completely encapsulated in a seamless unbroken film and an article on a backing board secured to the backing board by having similar unbroken seamless film adhered to the board and covering the article on the side spaced from the board surface on which it rests. These films are commonly and preferably clear. These coated articles and the method for producing them is dependent on and made possible by the velocity gradient separation and film projecting apparatus described above. The method consists of projecting a film that is substantially wider than the article to be encapsulated or the board supporting the article to be covered and passing the same through the film while it is being projected. This may be done by any suitable powered or gravity conveyor selected from numerous conventional types available and which form part of this invention only in combination with other structure as defined in the claims hereafter.

It has been proposed before to project or provide a thin curtain of a coating material for covering objects to be passed through the curtain and over which an even film of the material is deposited. One of the major shortcomings of all previously suggested methods and structures, however, has been their inability to efficiently remove bubbles from the coating material or liquid to provide a substantially clear or homogenous curtain or film of the material to be used as a commercially successful coating.

When using conventional bubble removing apparatus, the problem of removing entrained gas, principally air and other fluid vapor bubbles, from any fluid material or liquid coating, is even greater when one attempts to deal with extremely viscous materials such as molten polyethylene and similar fluid synthetic resinous materials or plastics. The nature of these viscous materials is such that bubbles created in them do not rise to the surface even slowly as they do in many of the liquids from which it is desired to remove bubbles but remain trapped in the fluid plastics almost indefinitely. This problem of entrained gas in the molten or fluid plastics was one which provided a very serious problem from the standpoint of providing a substantially clear or bubble-free (and therefore strong even though thin) curtain of the liquid material, usually including recirculated waste, until the present invention was made. Prior to discovering the present method and apparatus for removing bubbles, all of the previously suggested methods and structures were unsuccessful commercially, at least in use with very viscous liquids, as were the articles produced thereby. While a number of them would either minimize creation of bubbles or remove bubbles from the material to some degree there was always a serious problem remaining so that none of them were commercially or practically successful.

In projecting a film of molten platsic, for example, onto an object to be coated, any gas or vapor bubbles produce at least two undesirable effects. One problem is that the visibility through the film is reduced which makes it a commercially unsatisfactory package cover, because the object packaged is obscured by the milky condition of the plastic with entrained gas. The second and much more serious problem is that a very thin or weak spot in the film is produced which materially reduces the strength of the film so that it may rupture upon the shrinkage of the molten film as it hardens, or when subject to stress.

The method and apparatus of this invention has been found highly satisfactory in the removal of entrained gas bubbles, from viscous material in the range of 5000–20,000 centipoises and perhaps even greater viscosities. It has been discovered that liquids of lesser viscosity require a greater linear velocity for maximum separation and preferably a series of separations. It has been found that when fluid, particularly viscous fluid, is forced to flow linearly through an unobstructed tube with a minimum of turbulence, a velocity gradient is established by retardation of the flow at the periphery of the column through contact with the wall of the conduit. Thus, a velocity gradient is established in the form of a forwardly projecting conical or bullet cross section in the liquid. Gas bubbles, and particularly the larger ones, move to the center of the column of the liquid or to the portion behind the apex of the cone or behind the nose of the bullet and may be stripped out from this area of least shear by a concentric stripping tube. This concentration is emphasized as the viscosity increases. It is important to maintain the columnar flow with a minimum of turbulence.

Accordingly, it is an object of this invention to provide a method and apparatus for the removal of entrained gas bubbles from liquid in a conduit by velocity gradient separation.

It is yet another object of this invention to provide a means for removing entrained gas bubbles from liquids that is extremely compact and requires almost no space to be incorporated into other structure.

It is a still further object of this invention to provide a device of this nature which can be adjusted for the viscosity of the material being used.

A further object of this invention resides in providing a new and useful method or process for removing entrained gas bubbles from liquid.

Still a further object of this invention resides in a new and useful method or process for providing a substantially bubble-free liquid film.

It is a further object of this invention to provide a new and useful film coated article and process and coating device that projects a film substantially and consistently free from entrained bubbles.

A further object of this invention is to provide a coating structure that has a separating means having no parts that move while removal of entrained gas bubbles is taking place.

It is another object of this invention to provide a novel coated article consisting of an article encapsulated in a seamless, unbroken clear film.

Another object of this invention is to provide a novel coated article consisting of a treated backing board, an object to be packaged and a clear, unbroken film covering the object and sealed to said backing board.

Yet another object of this invention is to provide a curtain coating apparatus that recirculates fluids of viscosities of 5000 centipoise and more, yet provides a bubble-free curtain.

A further object of this invention resides in the provision of a method whereby columns of residual bubble containing material are used to maintain in generally planar extension a film from which the bubbles have been removed.

Other and further objects of the invention reside in the specific structural features of the apparatus including the primary bubble extracting or separating means, the secondary separating means, the control of the flow therefor, the film generating structure associated therewith, and cooperation between the separating means and the film generating nozzle.

Still other and further objects of the invention reside in the particular method steps for providing a liquid from which bubbles have been substantially removed.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

FIG. 1 is a partial front elevation, partial vertical section of a film or curtain projecting nozzle structure or apparatus embodying the present invention with broken lines illustrating hidden parts;

FIG. 2 is a partial plan view, partial horizontal section of the apparatus of FIG. 1 with hidden parts illustrated with broken lines;

FIG. 3 is a vertical section taken on the line 3—3 of FIG. 2; broken lines illustrate hidden parts;

FIG. 4 is a diagrammatic representation of an entire film generating system employing the film or curtain projecting apparatus of FIGS. 1–3 with broken lines illustrating a bubble entrained column of curtain material and hidden parts;

FIG. 5 is a fragmentary diagrammatic view showing an advanced position of an article to be coated, as it passes through the curtain of FIG. 4;

FIG. 6 is a view substantially identical to FIG. 5 but illustrating a still further advanced position of an article that has passed through and been coated by the curtain of FIG. 4;

FIG. 7 is a front elevational view of the bottom part of the nozzle of the curtain or film projecting apparatus showing the curtain projected therefrom;

FIG. 8 is a fragmentary sectional view of a modified form of structure of the instant invention; and FIG. 9 is a composite view of the bottom part of the nozzle, a film protected thereby, an article approaching the curtain and the encapsulated article after having passed through the curtain; the article shown approaching the curtain is shown in fragment to conserve space and the scale used is that of FIGS. 4, 5 and 6.

Reference is now made to the drawings and first to FIG. 4. The system is shown as comprising generally a reservoir 10 for containing fluid or coating material connected by a supply pipe or conduit 11 to a suitable pump 12. A discharge pipe or conduit 14 extends from the pump to a main or primary velocity gradient separator or bubble separating means generally designated 15. From this unit the separated or removed liquid with entrained bubbles enters the return pipe 16 and is discharged back into the reservoir 10. Another pipe 17 carrying liquid from which most of the entrained bubbles have been removed extends to a nozzle means including a secondary velocity gradient separator 18. Of course, it is to be understood that while it is preferred to reuse and recirculate the bubble-containing liquid which is removed, it is not necessary if cost is not considered. In such instance, pipe 16 (as well as pipe 24) can be connected to a waste receptacle.

From the nozzle means 18 a curtain or film 19 is projected downward between two suitable conveyors 20 and 21, which, as shown, are belt conveyors and have their top belt runs moving in the direction of the arrows. Between and below the two conveyors is the excess liquid or film material catch basin 22. It is connected by a suitable pipe such as 24 to the reservoir 10 so that any excess material may be returned to the reservoir for reuse normally or discarded as noted above.

As shown in FIG. 7, and as later explained in more detail, the film or curtain 19 projected by nozzle means 18 actually consists of a center film portion 25 from which bubbles have been removed, and usually clear, engaged at each side by a column 26 of the same liquid having the residual entrained air or gas bubbles 27. Usually the column 26 has so many entrained air bubbles in it that it appears to be foam-like material but the bubbles have been shown in the drawings as particulate bubbles.

FIG. 2 shows in more detail the structure of the primary bubbling removing means 15 and the secondary bubble separating means or nozzle means 18. In this figure, conduit 14 is shown positioned to supply liquid to the main bubble extracting means 15. Concentrically arranged within the main or outer conduit 14 is the inner bubble receiving tube or conduit 28, positioned to extend therein, as shown. It is preferably bevelled or chamfered on its inside free end as shown at 29 to provide a sharp division point as at 30 between the material entering tube 28 and that passing at the outside thereof.

Tube 28 is shown as pressed into and extending into the T-fixture 31 and terminates in a flat shoulder 32. Fixture 31 is in turn assembled in fluid-tight relation in the end of tube 14, as shown, which has its wall thickened at that point to receive the end of fixture 31. For example, it may be threaded into the fixture and turned by means of the knurled control knob 35. As will be appreciated, choke controls may be adjusted inwardly or outwardly (leftwardly or rightwardly with respect to FIG. 2) to seat or unseat on shoulder 32 to control the amount of liquid removed through tube 28 as desired. Return pipe 16 may thus be wholly or partially connected to tube 28 by withdrawing the screw threaded control member 34 or pipe 16 can be cut off from tube 28 by advancing or screwing in the control member 34. The main flow of liquid material bypasses the pipe 28 and flows out through the connecting pipe 17 and into the nozzle means or secondary bubble separating means 18, which takes the form of a curtain projecting nozzle block. Pipe 17 should be large enough to avoid any substantial buildup of back pressure in conduit 14 and preferably at least as large as conduit 14 less the area occupied by the tube 28.

Conduits 14 and 28 will commonly take the form of tubes or pipes, etc., particularly when liquid is being pumped through a unit such as nozzle 18. While conduits 14 and 28 are shown as cylindrical in cross section and both of the same cross-sectional shape, this is not necessary, although preferred. Thus, it is contemplated that conduits of rectangular or other cross section may be used and that the cross section of conduits 14 (or the main, larger conduit) need not be precisely the same in form as the cross section of conduit 28 (the takeoff or smaller conduit) although such identity of form is preferred. Likewise, when tubes are used, it is much preferred to place the inner tube concentrically with respect to the outer tube, some departure is acceptable and it may be only substantially concentrically positioned.

Nozzle block 18 is shown as suitably made up from two cooperating portions designated 18R for the rear portion and 18F for the front portion. The two portions are tightly secured together in any suitable manner as by multiple closely spaced cap screws 36 as seen in FIG. 1. Each of the two portions 18R and 18F of nozzle block 18 have a semicircular upper milled channel 37 which together form a cylindrical conduit or tube and into which the feed pipe 17 connects. Near each end of the channels 37 are the milled channels 38 which connect to lower milled channels 39. Channels 38 and 39 also, in cooperation, form conduits. The bottom portions of milled channels 39 are relieved very slightly so that when the two blocks are clamped tightly together as by the screws 36, there is a thin slot 40 extending entirely across the bottom of the nozzle block 18 which slot is connected to the channels 39 and initiates the film that is projected by the nozzle.

At each end of the conduit formed by channels 37 is placed a bubble takeoff tube, 41 and 41'. The bubble takeoff tues 41 and 41' terminate in chambers that are formed near the ends of the blocks and designated 42 and 42'. These chambers are milled in an oval pattern in order to provide flat outer sides 44, 44' against which the ends of bubble takeoff tubes 41, 41' may abut flatly. This is a construction expedient and is not essential structure, it being necessary only that the tubes and conduits join. The inside ends of the bubble takeoff tubes 41, 41' are also internally chamfered or bevelled to provide a sharp edge as at 45 for separating the liquid entering the tube from that passing around its exterior. Edge 45 is similar to edge 29 for tube 28.

Bubble takeoff choke control members 46, 46' (similar to member 34) are screw threaded into the ends of the nozzle block 18 for the purpose of controlling the amount of material that flows through bubble takeoff tubes 41, 41'. As in the case of the main bubble separating structure control member 34, these chokes screws 46, 46' are threaded into the end of the block and have knurled knobs to facilitate turning to advance toward or retract the choke screws from the seats formed by block 18 at the ends of channels 47, 47' which cooperate to form a conduit communicating with the inside of bubble takeoff tubes 41, 41'. The channels 47, 47' also communicate with vertically milled passages 48, 48' (again cooperating to form conduits) from each of which a stream of liquid having entrained air bubbles may be discharged in the same direction as the film projected from the relieved portion 40 of nozzle block 18. Note how the slot formed by relieved portions 40 and conduits or passages formed by channels 48, 48' join at 40 and 40'', respectively.

In FIG. 8 is shown a fragment of a modified form 15A of the primary bubble extracting unit 15 which is like the unit 15 in all respects except that the main conduit 23 comparable to conduit 14 is fluted on the inside as at 33 to provide greater inside conduit surface. This increases skin friction between the liquid and the main conduit which improves the bubble concentration in the center of the conduit 23, improving the efficiency of bubble concentration entering bubble takeoff tube 43, similar to tube 28.

In the utilization of the foregoing structure, it has been noted that if the inner bubble takeoff tube such as 28 or 45 is not concentric with its outer tube (14 in the case of tube 28 or the conduit formed by channels 37 in the case of tube 41) the structure is less efficient in removing the entrained bubbles from the entire liquid flow through the main conduit. Eccentricity of even several thousandths of an inch, for example, will reduce noticeably the efficiency of the bubble takeoff tubes 28, 41, 41' and 43. Furthermore, particularly in the case of the nozzle means 18, this may be a problem because in operation there should be a balance between the choke screw 46 and the choke screw 46'. With a slight eccentricity of either of the tubes 41 and 41', it is necessary to have the choke controls opened farther than otherwise would be necessary, since the two controls should be opened about the same amount in order to balance the flow of material. The less efficient one must be opened substantially farther than the more efficient one would need to be in order to actually remove all of the entrained air bubbles, but to retain balance both must be opened excessively compared to optimum conditions.

While a single separating structure such as that designated 15 will remove a very high percentage of the entrained bubbles in the liquid, it does not remove the desired amount of them without removing at the same time a high percentage of material that could be useful as bubble-free liquid.

According to the best of our knowledge and belief, there are three variables which are the principal ones to take into consideration when designing or constructing a separating apparatus as described herein. The first is the viscosity of the fluid being used. In viscosities having a centipoise value of 5000 (hereafter abbreviated cp.) or more, conventional debubbling apparatus is not very effective and entrained gas and liquid vapor bubbles will remain trapped and substantially immovable in the fluid for a long period of time. Conventional debubbling structures are necessarily very large and cumbersome even when debubbling liquids of viscosity as low as 2000 cp. When using the bubble extracting structure described herein, fluids of known viscosity of 20,000 cp. have been readily projected and recycled as visually clear films and similarly with fluids of viscosity estimated as high as 50,000 cp.

The second major variable to consider is the size of the takeoff tube in the conduit carrying the fluid from which the entrained gas bubbles are to be removed. In general, the more viscous the fluid, the smaller the separating or takeoff tube may be and still get effective removal. Generally also, the larger the takeoff tube the more complete is the separation achieved. Practically the takeoff tube must be as small as possible consistent with effective separation. The range suggested by experiments to date is to have the inner or takeoff tube of a diameter from ⅛ to ¾ of the main conduit diameter with ½ being a desirable ratio when dealing with high viscosity fluids, i.e., 5000 cp. and up. In terms of capacity or tube cross section area, if it is preferred to use tubes of other than cylindrical form, the range is 1/36 to 9/16.

We believe that velocity of the fluid is the third major factor controlling the efficiency of velocity gradient separation, since the greater the velocity the more pronounced the difference between the rate of flow of liquid at the center of the conduit and the flow adjacent the wall of the conduit. At the wall, the velocity is substantially zero. It is desirable to have the difference in velocity or the velocity gradient change as rapidly as possible from the wall surface to the center of the conduit. The velocity gradient will vary more rapidly as the average velocity of the material flowing in the conduit adjacent the takeoff tube increases. When dealing with liquids having a viscosity of from 2000 to 20,000 cp. a velocity in the range of 300 to 450 feet per minute is adequate to produce substantially total visual separation in two stages when the takeoff tube is ½ the diameter of the conduit. Liquids of lower viscosity would require greater velocities and/or larger takeoff tubes. The use to which material is to be put controls the viscosity, and in coating, the viscosity ranges from 2000 cp. when using the technique described and shown in FIGS. 4, 5 and 6, where a board and a fairly flat object are being covered, to a film having a viscosity of at least 10,000 cp. when encapsulating objects as shown in FIG. 9.

This method of separating discrete portions of immiscible matter, such as bubbles of gas, from a liquid has the same effect as increasing the specific gravity of the liquid in which the matter is entrained. At the same time, the specific gravity of the immiscible matter is not affected. Accordingly, there is an increased tendency of the entrained matter to move toward the low pressure area in the structure of this invention as compared to movement toward the surface of the same liquid in a gravity settling tank. In a specific example, where liquid of 2000 cp. viscosity was pumped at the rate of 7 gallons per minute through a tube having a diameter of ⅝ of an inch, it was calculated that the average velocity was 438 feet per minute. Velocity at the outside of the tube is zero and at the center of the tube twice average velocity of 876 feet per minute. The difference in velocity between the center of the tube and its edge, only 5/16 of an inch distant, is thus 876 feet per minute. This velocity in this size tube acting on a liquid of this viscosity was further calculated to have the same effect as increasing the density of the liquid at least 127 times. Theoretically the increase may be greater than 127 times, and the figure 127 was used to be conservative. It can be said, then, that bubbles of gas or other immiscible matter entrained in the liquid would have 127 times greater force applied moving them toward the low pressure portion of the liquid than in the same liquid in a gravity settling tank. Another way of stating the same thing is that for a given settling tank, liquid of the same viscosity would have to have a specific gravity 127 times as great to produce the same separating action. When the effective or artificial specific gravity of the liquid is increased by a factor as great as this, natural gravity has relatively small effect on the discrete matter, such as gas bubbles, being separated so that the system will operate satisfactorily in any attitude. Theoretically, however, most effective action will occur when the separation takes place in a vertical direction so that gravity has zero effect as far as the movement of the entrained immiscible matter through the liquid is concerned. While the structure was evolved to separate entrained gas bubbles from liquids, the rate of pressure change per unit of distance of the liquid is so tremendously enhanced by this technique that it is envisioned as a means for separating matter that is heavier than the liquid by inducing it to move to the center of the rapidly flowing liquid in which immiscible matter is entrained. It appears that almost any matter which is immiscible in the liquid can be separated, if the viscosity and speed of the liquid and size of the takeoff tube are adequate with respect to the discrete pieces or bubbles which are to be removed.

When constructing units for separating air bubbles from liquids used in the packaging techniques described herein, unit 15 is so constructed and arranged that the outside diameter of the bubble takeoff tube 20 is from ⅛ to ¾ and preferably approximately ½ the inside diameter of the main flow conduit 14. Experience so far shows that more viscous liquids can employ a smaller tube and less viscous a larger one. It is estimated from visual inspection that with the illustrated arrangement of tube diameters, an average velocity range of about 300 to 450 feet per minute, a viscosity in the range of 2000 to 20,000 cp., and a very sharp cutoff edge 30 provided by the internal chamfer 29, the flow control member 35 may be adjusted to takeoff between 85 and 95 percent of the entrained bubbles in molten plastic without sacrificing excessive quantities of material that might be useful as clear liquid film forming substance. The second stage of the device is similarly effective in removing 85–96 percent of the remaining entrained bubbles. For purposes of illustration, a hypothetical example in which each of the bubble extracting units remove 90 percent of the entrained bubbles would leave a total of 1 percent of the original bubbles in the final film.

As a practical matter, however, the film that finally emerges from the nozzle slot 40 is visually free of bubbles. Furthermore, by turning the choke screws 35, 46 and 46′ in, the bubbles may be made to appear in the film, and by backing off the control members 35, 36 and 36′, the bubbles may be made to disappear from the film or curtain 25.

It is also important to note that while the tubes 28, 41 and 41′ could be chamfered on the outside as well as the inside and still produce a sharply defined edge for separating the material with entrained bubbles and that which has none, to place the chamfer on the outside might introduce turbulence and bubbles into the otherwise smoothly flowing material that is substantially free from bubbles. It is considered preferable, therefore, to have the chamfer an internal one rather than an external one. For the same reason, bending of conduit 14 near tube 28 or placing any structure within conduit 14 except tube 28 should be avoided to the extent possible. In fact, any substantial bending or imposition in the conduit of turbulence producing structure may destroy the bubble removing capacity of the structure at least in the sense of producing bubble-free liquid.

While all of the bubble removal from the film or curtain material could be accomplished prior to supplying it to nozzle slot 40, it is possible to remove at least part of the material having entrained bubles at the nozzle itself use the bubble containing material as a stabilizing column at each margin of the film or curtain 25. Even with these columns of bubbles helping to hold the curtain edge from drawing together, the edges of the curtain or film slant inwardly slightly. This is a natural result of the molten material tending to contract under the influence of surface tension and cooling. This contracting of the film both reduces the width of the curtain the farther it gets from nozzle slot 40 and causes it to thicken.

If curtain film 25 were projected from nozzle 40 without the latter being in contact with the bubble columns, it would contract or diverge inwardly at the edges substantially as shown by the broken lines 50. However, when the film is projected to contact with the columns of material having entrained air, the contracting tendency is counteracted in part. The columns are substantially thicker in section than the film and also are cylindrical in pattern. For these reasons, surface tension in the liquid columns will only reduce the diameter of the cylindrical formation, and the columns tends to project straight downwardly. Being in contact with the edge of the curtain, they tend to hold the curtain in a stretched condition and produce a double desired effect. In the first place, they increase the breadth of the usable portion of the curtain substantially and in the second place they tend to retain the curtain at a uniform thickness throughout its useful projection. Thus, the entrained air bubble separating structure at the nozzle itself serves the dual important functions of extracting the last traces of air bubbles from the curtain material and at the same time provide a curtain with stabilizing column at each marginal edge. Ball type chains have also been found to produce the same result if secured at the ends of the nozzle slot 40. These balls act on film 25 in exactly the same way that bubble columns 26 do.

Reference to FIGS. 5 and 6, in cooperation with FIG. 4, illustrates an article being coated by the foregoing structure. In those figures, and particularly in FIG. 4 in the first instance, an object 51 such as any suitable piece of merchandise to be packaged is shown lying on a treated backing card 52 to which the film will adhere, which serves as a support for the object and which also may contain advertising and sales material. The treatment applied to the board to permit adherence of the molten plastic forms no part of this invention per se, hence need not be described here. The speeds of operation of belts 20 and 21 are within the range of ½ to 6 times the rate of flow of the film 19 being projected by the nozzle block 18.

As shown in FIG. 5, the conveyor 20 has projected the object 51 well into the film or curtain 25 which is shown extending over the card 52 in the front of the object 51. As illustrated here, it appears to be a film covering the object in only two dimensions. In actual fact, of course, the material flows over the sides of the object 51 and engages the card on the marginal edges, as shown at the front of the card 52 (see also FIG. 7). In FIG. 6, the initial object 51 and its card 52 have been projected entirely through curtain 25 and is covered with a film consisting of a portion of curtain 25 and designated 25F. At the same instant, a second object 51' is about to be projected on its card 52' into the curtain 25. Between objects and also at the marginal edges of any object will be excess curtain material and the bubble columns 26 which of course fall into and are caught by return trough 22. Pipe 24 conducts material in trough 22 back to reservoir 10.

When a structure such as that illustrated here is used in conjunction with material such as polyethylene, which must be heated to a relatively high temperature in order to remain in a molten state, the entire mechanism or desired portions thereof are heated by means of any suitable heating structure such as jacketing 53 surrounding all of the structure except return tube 16 which has a heating pipe 53' connected into the main jacket 53 through which heated liquid is pumped via an inlet 54 and an outlet 54'. Thus a suitable heating arrangement for the circuit is provided to keep resin in it in a liquid state. As the heating structure may be conventional, it is neither shown nor described in more detail, since it forms no part of this invention per se.

In FIG. 9 is seen a portion of the nozzle 55 substantially identical to nozzle 18, discharging a film or curtain 56 through which an object such as a pen represented at 57 is projected by suitable structure, or by hand. The projection is in the direction shown by the large arrow and the orientation of the pen 57 to the film 56 is endwise. As the pen is projected through the curtain as by being propelled from any suitable conveyor and allowed a free fall through the curtain generally in the direction of the arrow, the pen is completely encapsulated by the falling curtain and comes out as seen at the left where film 58 forms a seamless, unbroken sheath around the pen. This type of packaging requires a film curtain of considerable strength and requires a material having a viscosity of 10,000 cp. or more. The speed of the pen through the curtain is preferably within the range of ½ to 6 times the linear fall of the curtain though experiments suggest that higher speeds may be acceptable with stronger films than those presently available.

It is apparent that many modifications and variations of this invention as hereinbefore set forth may be made without departing from the spirit and scope thereof. The specific embodiments described are given by way of example only and the invention is limited only by the terms of the appended claims.

What is claimed:

1. A method of degassing a viscous liquid which includes the steps of establishing along a confined path a laminar flow of a viscous liquid having bubbles of gas contained therein so that a shear gradient is imposed upon such liquid between the central and outermost portions thereof to cause bubbles of contained gas in the outermost portion to migrate toward the central portion of the liquid flow concomitantly as the liquid travels along the confined path, separating the outermost portion of the liquid flow from the remainder thereof and collecting the separated portion of the liquid.

2. A method according to claim 1 wherein the innermost portion is separated from the remainder of the liquid flow while essentially free of turbulence.

3. A method according to claim 1 wherein the liquid has a viscosity greater than about 2000 cp.

4. A method of degassing a viscous liquid which includes the steps of feeding a stream of viscous liquid containing gas bubbles into and through a conduit as a laminar flow to cause the contained gas bubbles to move inward away from the regions of high-shear stress along the conduit wall, maintaining the laminar flow of viscous liquid through the conduit until at least a portion of the contained bubbles of gas accumulate along the central section of the conduit, and separately collecting the outermost portions of the stream of viscous liquid from the remainder thereof with a minimum of turbulence.

5. The method of eliminating from a viscous liquid discrete bodies of immiscible fluid material contained therein, which method is characterized by:

(A) establishing and maintaining flow of the viscous liquid as a stream along a confining surface at a velocity which insures that the flow of the liquid will be laminar for a substantial distance along said surface, so that the liquid is caused to have a velocity gradient, and consequently a static pressure gradient, transversely to said surface whereby the discrete particles of immiscible fluid material contained in the viscous liquid are impelled to migrate away from said surface; and (B) removing viscous liquid which is acceptably free from discrete particles of immiscible fluid material from a portion of the stream adjacent to said surface at a downstream zone within said distance.

6. The method of eliminating from a viscous liquid discrete bodies of immiscible fluid material contained therein, which comprises:
 (A) establishing and maintaining flow of the viscous liquid as a stream along a confining surface at a velocity which insures that flow of the liquid will be laminar for a substantial distance along said surface, so that the liquid is caused to have a velocity gradient, and consequently a static pressure gradient, transversely to said surface whereby the discrete particles of immiscible fluid material contained in the viscous liquid are impelled to migrate away from said surface; and
 (B) at a downstream zone within said distance at which a portion of the stream adjacent to said surface is acceptably free from discrete particles of immiscible fluid material, separating the portion of the stream that is nearest said surface from the remainder thereof.

7. The method of ridding a viscous liquid of discrete bodies of immiscible fluid material contained therein, which comprises:
 (A) establishing and maintaining a flowing stream of the viscous liquid through a tubular conduit at a rate to keep the conduit filled, and at a velocity that insures laminar flow of the liquid along a substantial length of the conduit by which there is caused to be a velocity gradient and consequently a static pressure gradient transversely across the stream whereby the discrete bodies of immiscible fluid material contained in the viscous liquid are caused to migrate toward the core portion of the stream; and
 (B) at a downstream zone of said length of the conduit at which the peripheral portion of the stream is acceptably devoid of discrete bodies of immiscible fluid material, separating the peripheral portion of the stream from the remainder thereof.

8. Apparatus of the type wherein viscous material is caused to flow from source means providing a supply thereof to debouchment means from which such liquid is intended to issue in a condition substantially free from discrete bodies of immiscible material, characterized by:
 (A) an elongated outer tubular conduit having upstream and downstream ends, the former being communicated with the source means;
 (B) an inner smaller tubular conduit having open upstream and downstream ends and positioned within the outer tubular conduit in spaced relation with the inner surface thereof so that downstream of the open upstream end of the inner tubular conduit, the conduits coact to define an annular flow passage encircling the inner tubular conduit,
  the open upstream end of the inner tubular conduit being spaced a substantial distance downstream from the upstream end of the outer tubular conduit and the outer tubular conduit upstream of the open upstream end of the inner tubular conduit being of uniform cross section;
 (C) means defining an outlet through the wall of the outer tubular conduit and from said annular passage at a zone downstream of the open upstream end of the inner tubular conduit;
 (D) means closing said annular flow passage downstream of said outlet so that liquid which enters the annular passage leaves the same only through said outlet,
  said outlet being communicated with said debouchment means; and
 (E) means for moving viscous liquid from said source means into the outer tubular conduit at a rate to keep said conduit filled and at a velocity to insure that upstream of the open upstream end of the inner tubular conduit the flow of the viscous material is laminar so that there is a velocity gradient and consequently a static pressure gradient between the viscous liquid near the wall of the outer tubular conduit and the viscous liquid remote from said wall,
  whereby discrete particles of immiscible material in the viscous liquid are impelled to migrate away from said surface so that the liquid which enters the annular passage and flows to the debouchment means contains far less of said discrete particles than does the viscous liquid which flows from the open downstream end of the inner tubular conduit.

9. The apparatus of claim 8 further characterized by choke means at the downstream end of the inner tubular conduit to control the flow of viscous liquid leaving the same.

10. Apparatus of the type wherein viscous material is caused to flow from source means providing a supply thereof to debouchment means from which such liquid is intended to issue in a condition substantially free from discrete bodies of immiscible material, characterized by:
 (A) an elongated outer tubular conduit having upstream and downstream ends, the former being communicated with the source means;
 (B) an inner smaller tubular conduit having open upstream and downstream ends and positioned within the outer tubular conduit in spaced relation with the inner surface thereof so that downstream of the open upstream end of the inner tubular conduit, the conduits coact to define an annular flow passage encircling the inner tubular conduit,
  the open upstream end of the inner tubular conduit being spaced a substantial distance downstream from the upstream end of the outer tubular conduit and the outer tubular conduit upstream of the open upstream end of the inner tubular conduit being of uniform cross section;
 (C) means located at a zone downstream of the open upstream end of the inner tubular conduit defining the only outlet from said annular flow passage and communicated with said debouchment means;
 (D) means for moving viscous liquid from said source means into the outer tubular conduit at a rate to keep said conduit filled and at a velocity to insure that upstream of the open upstream end of the inner tubular conduit the flow of the viscous material is laminar so that there is a velocity gradient and consequently a static pressure gradient between the viscous liquid near the wall of the outer tubular conduit and the viscous liquid remote from said wall,
  whereby discrete particles of immiscible material in the viscous liquid are impelled to migrate away from said surface so that the liquid which enters the annular passage and flows to the debouchment means contains far less of said discrete particles than does the viscous liquid which flows from the open downstream end of the inner tubular conduit; and
 (E) choke means at the downstream end of the tubular inner conduit to control the flow of viscous liquid leaving the same.

References Cited

UNITED STATES PATENTS 2,943,946   7/1960   Hawtin et al. _____ 210—512 X
3,103,942   9/1963   Sharp _____ 137—171 X

OTHER REFERENCES

Ellis, Cecil B.: "Fresh Water From the Ocean," The Ronald Press Co., New York, 1954, pp. 61–67.

J. L. DE CESARE, Primary Examiner

U.S. Cl. X.R.

55—199; 210—65, 188